(12) United States Patent
Song

(10) Patent No.: US 9,329,702 B2
(45) Date of Patent: May 3, 2016

(54) NAVIGATIONAL DEVICE WITH ADJUSTABLE TRACKING PARAMETER

(71) Applicant: PIXART IMAGING INC., Hsin-Chu County (TW)

(72) Inventor: Willie Song, Penang (MY)

(73) Assignee: Pixart Imaging Inc., Hsin-Chu County (TW)

( * ) Notice: Subject to any disclaimer, the term of this patent is extended or adjusted under 35 U.S.C. 154(b) by 188 days.

(21) Appl. No.: 13/935,741

(22) Filed: Jul. 5, 2013

(65) Prior Publication Data

US 2015/0009146 A1    Jan. 8, 2015

(51) Int. Cl.
*G06F 3/033*     (2013.01)
*G06F 3/0354*    (2013.01)
*G06F 3/03*      (2006.01)
*G06F 3/038*     (2013.01)

(52) U.S. Cl.
CPC .......... *G06F 3/03543* (2013.01); *G06F 3/0317* (2013.01); *G06F 3/0383* (2013.01)

(58) Field of Classification Search
None
See application file for complete search history.

(56) References Cited

U.S. PATENT DOCUMENTS

| | | | | |
|---|---|---|---|---|
| 6,144,366 A * | 11/2000 | Numazaki | ............... | G06F 3/011 345/156 |
| 7,053,358 B2 * | 5/2006 | Shih | ................ | G06F 3/0317 250/221 |
| 7,230,606 B2 * | 6/2007 | Ahn | .................. | G06F 3/0317 250/221 |
| 7,444,006 B2 * | 10/2008 | Lin | .................. | G06T 7/0004 345/158 |
| 8,179,369 B2 * | 5/2012 | Kwak | ............... | G06F 3/0317 250/221 |
| 8,355,541 B2 * | 1/2013 | Wolfe | ............... | G06T 7/401 382/108 |
| 8,730,168 B2 * | 5/2014 | Moyer | .............. | G06F 3/0317 345/163 |
| 2006/0132443 A1 * | 6/2006 | Chien Wu | .......... | G06F 1/3215 345/166 |
| 2006/0133650 A1 * | 6/2006 | Xie | .................. | B41J 11/009 382/108 |
| 2007/0008286 A1 * | 1/2007 | Theytaz | ............ | G06F 3/03543 345/166 |
| 2007/0229503 A1 * | 10/2007 | Witzel et al. | ............... | 345/428 |
| 2007/0273653 A1 * | 11/2007 | Chen | ................ | G06F 3/1415 345/166 |
| 2008/0158158 A1 * | 7/2008 | Cheah | .............. | G06F 3/0317 345/166 |
| 2010/0079411 A1 * | 4/2010 | Lee et al. | ................. | 345/175 |
| 2011/0013808 A1 * | 1/2011 | Wolfe | .............. | G06T 7/401 382/108 |
| 2011/0150363 A1 * | 6/2011 | Chen | ................ | G06F 3/0304 382/291 |
| 2011/0181511 A1 * | 7/2011 | Yang | ................ | G06K 9/036 345/158 |
| 2011/0310018 A1 * | 12/2011 | Song | ................ | G06F 3/0312 345/166 |
| 2012/0127076 A1 * | 5/2012 | Song | ................ | G06F 3/038 345/166 |
| 2012/0274606 A1 * | 11/2012 | Song | ................ | G06F 3/042 345/175 |
| 2013/0215257 A1 * | 8/2013 | Huang | .............. | G06F 3/0317 348/86 |
| 2013/0241835 A1 * | 9/2013 | Lee | ................... | G06F 3/0304 345/166 |

* cited by examiner

*Primary Examiner* — Dismery Mercedes
(74) *Attorney, Agent, or Firm* — Rosenberg, Klein & Lee

(57) ABSTRACT

A navigation device includes an image sensor, a memory unit and a processing unit. The image sensor is configured to capture an image frame of a work surface. The memory unit previously saves a lookup table including surface quality profiles of different surface categories. The processing unit is configured to calculate surface qualities of the work surface associated with different quality thresholds and to compare the surface qualities with the lookup table to determine the surface category of the work surface thereby selecting a tracking strategy associated with the surface category of the work surface.

19 Claims, 5 Drawing Sheets

| quality TH | A category squal count | B category squal count | C category squal count | D category squal count | image frame |
|---|---|---|---|---|---|
| 8 | 111 | 88 | 52 | 63 | 105 |
| 16 | 94 | 59 | 18 | 24 | 80 |
| 24 | 81 | 37 | 4 | 9 | 69 |
| 32 | 68 | 23 | 1 | 3 | 56 |
| 40 | 57 | 15 | 0 | 1 | 49 |
| 48 | 44 | 9 | 0 | 0 | 35 |
| 56 | 37 | 6 | 0 | 0 | 31 |
| 64 | 30 | 4 | 0 | 0 | 25 |
| tracking parameter | DOF A filter A block size A | DOF B filter B block size B | DOF C filter C block size C | DOF D filter D block size D | |
| auto exposure | parameter range A | parameter range B | parameter range C | parameter range D | |

FIG. 3A

| capture parameter 1 / quality TH | A category squal count | B category squal count |
|---|---|---|
| 8 | 111 | 88 |
| 16 | 94 | 59 |
| 24 | 81 | 37 |
| 32 | 68 | 23 |
| . | . | . |
| . | . | . |
| . | . | . |
| tracking parameter | DOF A<br>filter A<br>block size A | DOF B<br>filter B<br>block size B |
| capture parameter 2 / quality TH | A' category squal count | B' category squal count |
| 8 | 99 | 69 |
| 16 | 83 | 40 |
| 24 | 75 | 29 |
| 32 | 61 | 19 |
| . | . | . |
| . | . | . |
| . | . | . |
| tracking parameter | DOF A<br>filter A<br>block size A | DOF B<br>filter B<br>block size B |

FIG. 3B

NAVIGATIONAL DEVICE WITH ADJUSTABLE TRACKING PARAMETER

BACKGROUND

1. Field of the Disclosure

This disclosure generally relates to an input device and, more particularly, to a navigation device and an operating method thereof with adjustable tracking parameters according to the type of a working surface.

2. Description of the Related Art

An optical mouse is generally operated on a work surface and configured to calculate a relative movement with respect to the work surface. The optical mouse generally includes an image sensor and a processing unit. The image sensor captures image frames at an exposure parameter. The processing unit is configured to calculate an average intensity of the image frames and determine whether to adjust the exposure parameter according to the calculated average intensity. For example, if the work surface is a reflective surface, the captured image frames can have a higher average intensity such that an exposure time may be shortened to allow the processing unit to he able to calculate the relative movement correctly. On the contrary, if the work surface is an absorptive surface, the captured image frames can have a lower average intensity such that the exposure time may need to be extended to increase the image feature.

However, conventionally the tracking strategy of the optical mouse was not changed with the adjustment of the exposure parameter. The tracking strategy could be an important factor to determine the correctness of calculating the relative movement.

Accordingly, the present disclosure further provides a navigation device and an operating method of the navigation device that may select different tracking strategies based on different surface types of a work surface so as to improve the calculation accuracy or the calculation efficiency.

SUMMARY

The present disclosure provides a navigation device and an operating method of the navigation device that may determine a tracking strategy corresponding to the surface type of a work surface on which the navigation device is currently operated.

The present disclosure further provides a navigation device and an operating method of the navigation device that may perform different auto exposure mechanisms corresponding to different surface types of the work surface thereby reducing the power consumption or enhancing the image quality.

The present disclosure provides a navigation device including an image sensor, a memory unit and a processing unit. The image sensor is configured to capture an image frame of a work surface with a predetermined image capture parameter. The memory unit saves a lookup table including surface quality profiles of different surface categories associated with the predetermined image capture parameter and a plurality sets of tracking parameters, wherein each of the surface categories is associated with one set of the tracking parameters. The processing unit is configured to calculate surface qualities of the image frame, to compare the surface qualities of the image frame with the lookup table to determine the surface category of the work surface and to perform a tracking operation according to the set of the tracking parameters corresponding to the surface category of the work surface.

The present disclosure further provides an operating method of a navigation device including the steps of: capturing, using an image sensor, an image frame of a work surface with a predetermined image capture parameter; calculating, using a processing unit, surface qualities of the image frame associated with different quality thresholds; comparing, using the processing unit, the surface qualities of the image frame with a lookup table, which includes surface quality profiles of different surface categories associated with the predetermined image capture parameter, thereby determining a surface category of the work surface; and performing a tracking operation according to the surface category of the work surface.

The present disclosure further provides an operating method of a navigation device including the steps of: capturing, using an image sensor, a first image frame of a work surface with a predetermined image capture parameter; calculating, using a processing unit, an average intensity of the first image frame to determine an operation image capture parameter; capturing, using the image sensor, a second image frame of the work surface with the operation image capture parameter; calculating, using the processing unit, surface qualities of the second image frame associated with different quality thresholds; comparing, using the processing unit, the surface qualities of the second image frame with a lookup table including surface quality profiles of different surface categories associated with the operation image capture parameter thereby determining a surface category of the work surface; and performing a tracking operation according to the surface category of the work surface.

In one aspect, each of the surface quality profiles includes a plurality of surface qualities versus different quality thresholds, wherein the surface qualities and the quality thresholds may be pixel intensities of a filtered image frame.

In one aspect, each set of the tracking parameters includes at least one of a depth of field, a digital filter type and a block size.

In one aspect, the image capture parameter may include parameters of both the light source and the image sensor in capturing the image frames, e.g. at least one of an exposure time, a shutter time, an image gain, a lighting duration and a lighting brightness.

The navigation device and the operating method of the present disclosure may calculate the displacement, perform lift-off detection and auto exposure mechanism corresponding to different surface categories such that different tracking strategies may be taken to achieve the object of reducing the power consumption or increasing the calculation accuracy.

BRIEF DESCRIPTION OF THE DRAWINGS

Other objects, advantages, and novel features of the present disclosure will become more apparent from the following detailed description when taken in conjunction with the accompanying drawings.

FIGS. 3A-3B show exemplary lookup tables including surface quality profiles of different surface categories in the present disclosure.

DETAILED DESCRIPTION OF THE EMBODIMENT

It should be noted that, wherever possible, the same reference numbers will be used throughout the drawings to refer to the same or like parts.

Figure 1:
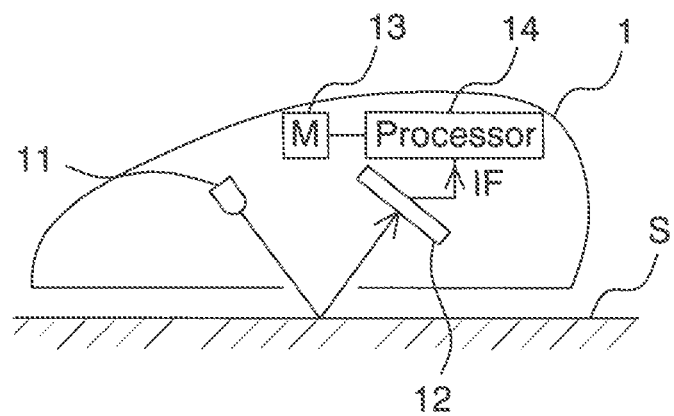
FIG. 1 shows a schematic diagram of the navigation device according to an embodiment of the present disclosure.

Referring to FIG. 1, it shows a schematic diagram of the navigation device 1 according to an embodiment of the present disclosure, which is shown similar to an optical mouse herein. The navigation device 1 is configured to be operated on a work surface S so as to perform the tracking operation, e.g. calculating the displacement, and/or performing lift-off detection, according to captured image frames of the work surface S. The navigation device 1 includes a light source 11, an image sensor 12, a memory unit 13 and a processing unit 14, wherein the memory unit 13 may or may not be integrated in the processing unit 14. In addition, the navigation device 1 of the present disclosure may further include a lens or lens set configured to adjust the optical path.

The navigation device 1 of the present disclosure is configured to adopt different tracking strategies corresponding to different categories of the work surface S; e.g. in a surface category having apparent image features, a smaller comparison block, a lower filter size and filter strength, and a smaller depth of field (DOF) may be adopted; on the contrary, in a surface category having poor image features, a larger comparison block, a higher filter size and filter strength, and a larger depth of field (DOF) may be adopted.

The filter size and filter strength may determine the filtering effect of a digital filter for processing an image frame IF captured by the image sensor 12. The comparison block may be referred to the reference block and the search block used in calculating the displacement; for example, the processing unit 14 may select a reference block in a first image frame and select a search block in a second image frame in order to calculate the displacement according to the correlation between the reference block and the search block. Details of adjusting a block size of the comparison block may be referred to U.S. Patent Publication No. 2011/0150363, entitled "Displacement detection apparatus and method" and assigned to the same assignee of the present application. The depth of focus may be used in the lift-off detection. Since the depth of field, digital filter type and block size may affect the tracking operation, they are referred to the tracking parameter in the present disclosure.

The light source 11 may be at least one light emitting diode, laser diode or other active light sources. The light source 11 is configured to illuminate the work surface S with a lighting duration, a lighting frequency and/or a lighting brightness (e.g. determined by the driving current or voltage of the light source). For example, when the lighting duration and/or lighting brightness is larger, the work surface S can reflect stronger reflected light; whereas when the lighting duration and/or lighting brightness is smaller, the work surface S can reflect weaker reflected light. The light source 11 may emit light of a fixed wavelength or a variable wavelength, preferably in the invisible spectrum.

The image sensor 12 may be a CCD image sensor, a CMOS image sensor or other sensors adapted to convert optical energy to electric signals. The image sensor 12 is configured to successively capture reflected light from the work surface S illuminated by the light source 11 with an exposure time, a shutter time and/or an image gain so as to output image frames IF. For example, when the exposure time, shutter time and/or image gain is larger, the average brightness of the image frames IF is higher; whereas when the exposure time, shutter time and/or image gain is smaller, the average brightness of the image frames IF is lower. Since the exposure time, shutter time and image gain may affect the captured image frames IF, they are referred to the image capture parameter in the present disclosure. In addition, as the operational parameter of the light source 11, e.g. the lighting duration and lighting brightness, may also affect the captured image frames IF, the image capture parameter herein may further include the lighting duration and the lighting brightness of the light source 11. In one embodiment, the image sensor 12 may have a sampling frequency higher than a lighting frequency of the light source 11 such that it is able to calculate a difference between a bright image frame (i.e. when light source turning on) and a dark image frame (i.e. when light source turning off) to eliminate ambient noises.

As mentioned above, as the image capture parameter may affect the captured image frames IF, the image sensor 12 preferably captures an image frame of the work surface S with a predetermined image capture parameter in order to categorize the work surface S fairly. The memory unit 13 previously saves a lookup table including surface quality profiles of different surface categories associated with the predetermined image capture parameter and saves a plurality sets of tracking parameters, wherein each of the surface categories of the lookup table is associated with one set of the tracking parameters.

Figure 2:
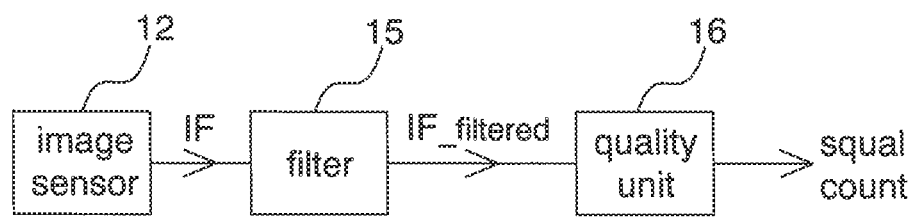
FIG. 2 shows a schematic diagram of calculating the surface quality count by the navigation device according to the embodiment of the present disclosure.

For example, FIG. 3A shows a lookup table including surface quality profiles of four surface categories A-D associated with the predetermined image capture parameter. Each of the surface categories is associated with one set of the tracking parameters, e.g. including DOF A-DOF D, filter A-filter 13 and block size A-block size D having different values. As can be seen in FIG. 3A, each of the surface quality profiles is associated with one category and includes a plurality of surface qualities (i.e. squal counts) versus different quality thresholds, e.g. including 8, 16, 24 . . . 64. In the present disclosure, the surface qualities are digital values indicating the pixel intensity of the image frame IF, e.g. the intensity difference between adjacent pixels of the imager frame IF or intensity response with respect to different light color emitted by the light source 11, but not limited to. The pixel intensity may also be other characteristics configured to reveal features of the image frame IF. It is appreciated that numbers of the categories and quality thresholds are not limited to those shown in FIG. 3A, For example, a method of constructing a surface quality profile may be shown in FIG. 2. The image sensor 12 outputs a digital image frame IF. A filter 15 is configured to filter the image frame IF and output a filtered image frame $IF\_{filtered}$, wherein the filter 15 is a digital filter adapted to reveal features of the image frame IF, A quality unit 16 then compares the intensity of every pixel (or the intensity difference between adjacent pixels) in the filtered image frame $IF\_{filtered}$ with different quality thresholds (e.g. 8-64 shown in FIG. 3A) and obtains the number of pixels (e.g. the squal count herein) having the intensity larger than the quality thresholds. For example in the A category of FIG. 3A, 111 pixels have the intensity larger than quality threshold (TH) 8, 94 pixels have the intensity larger than quality threshold 16, . . . and so on, And the same process may be performed corresponding to different categories of the work surface S. In this manner, a lookup table including surface quality profiles of different surface categories may be constructed and previously saved in the memory unit 13. More specifically speaking, a surface quality profile indicates the surface quality distribution with respect to the quality threshold, In the present disclosure, the filter 15 and the quality unit 16 may or may not be integrated in the processing unit 14.

The processing unit 14 may be a digital signal processor (DSP) or the like configured to post-process the image frames IF outputted from the image sensor 12. In the present disclosure, the processing unit 14 is configured to calculate surface qualities of an image frame IF, to compare the surface qualities of the image frame IF with the lookup table to determine a surface category of the work surface S and to perform a tracking operation according to the set of the tracking parameters corresponding to the surface category of the work surface S.

The processing unit 14 calculates surface qualities of the image frame IF associated with at least a part of the different quality thresholds used to construct the lookup table (e.g. 2, 16 . . . 64 shown in FIG. 3A) so as to obtain a surface quality profile of the work surface S, e.g. 105, 80, 69 . . . 25 as shown in FIG. 3A. It is appreciated that more quality thresholds are calculated, a higher accuracy of categorizing may be obtained.

After comparing the quality profile of the image frame IF with the lookup table, e.g. calculating a similarity between the surface qualities of the image frame IF and the surface quality profiles of the lookup table, it is able to categorize the work surface S. For example, it is able to calculate a sum of absolute value of differences or a sum of square of differences, but not limited to, between the surface qualities of the image frame IF and the squal count of every surface quality profile at every quality threshold to be served as the similarity, e.g. the image frame IF having the highest similarity with the surface quality profile of category A in FIG. 3A. The processing unit 14 then selects the set of the tracking parameters corresponding to the surface category of the work surface S, e.g. DOF A, filter type A and block size A, so as to calculate the displacement and perform lift-off detection. It is appreciated that in a long term operation, the navigation device 1 may periodically check the category of the work surface S so as to determine whether to change the tracking strategy.

In addition, the navigation device 1 is further configured to perform an auto exposure corresponding to the surface category of the work surface S; i.e. each of the surface categories may he associated with a respective auto exposure mechanism. For example, a predetermined adjustable range of adjusting the image capture parameter may be previously set corresponding to each auto exposure mechanism so as to maintain the average brightness of the image frames IF captured by the image sensor 12 within a predetermined range, e.g. 150-180 gray level of a 255 gray level scale, but not limited thereto. In the category having apparent features, the auto exposure may be. selected to reduce the power consumption; whereas in the category having poor features, the auto exposure may be selected to improve the calculation accuracy.

In addition, the predetermined image capture parameter may be replaced by an image capture parameter according to an average intensity of a previous image frame. That is, it is able to firstly capture a checking image frame and calculate the average brightness thereof. Then, the navigation device 1 determines a set of image capture parameters according to the average brightness calculated, In this embodiment, the memory unit 13 may previously save a plurality of lookup tables associated with different sets of image capture parameters (i.e. different categories) as shown in FIG. 3B. When a set of image capture parameters (e.g. capture parameter 1 or 2) is determined, the corresponding lookup table is then determined. Or the memory unit 13 may save only one lookup table and than add an offset to the surface quality profiles using a predetermined offset algorithm associated with different sets of the image capture parameters; e.g. in FIG. 3B the A' and B' categories respectively have a downward offset from the A and B categories. It is appreciated that the offset is not limited to downward offset, a upward offset is also possible.

Figure 4:
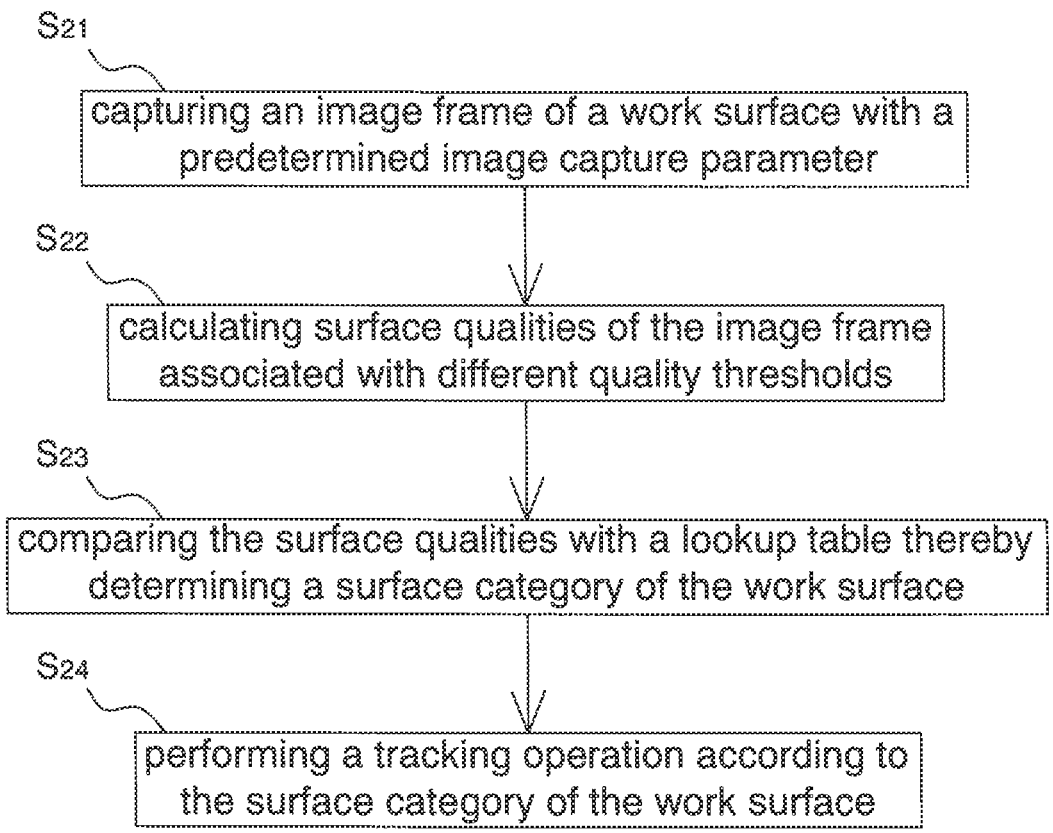
FIG. 4 shows a flow chart of the operating method of a navigation device according to an embodiment of the present disclosure.

Referring to FIG. 4, it shows a flow chart of the operating method of a navigation device according to an embodiment of the present disclosure, which includes the steps of: capturing an image frame of a work surface with a predetermined image capture parameter (Step $S_{21}$); calculating surface qualities of the image frame associated with different quality thresholds (Step $S_{22}$); comparing the surface qualities with a lookup table thereby determining a surface category of the work surface (Step $S_{23}$); and performing a tracking operation according to the surface category of the work surface (Step $S_{24}$).

Figure 5:
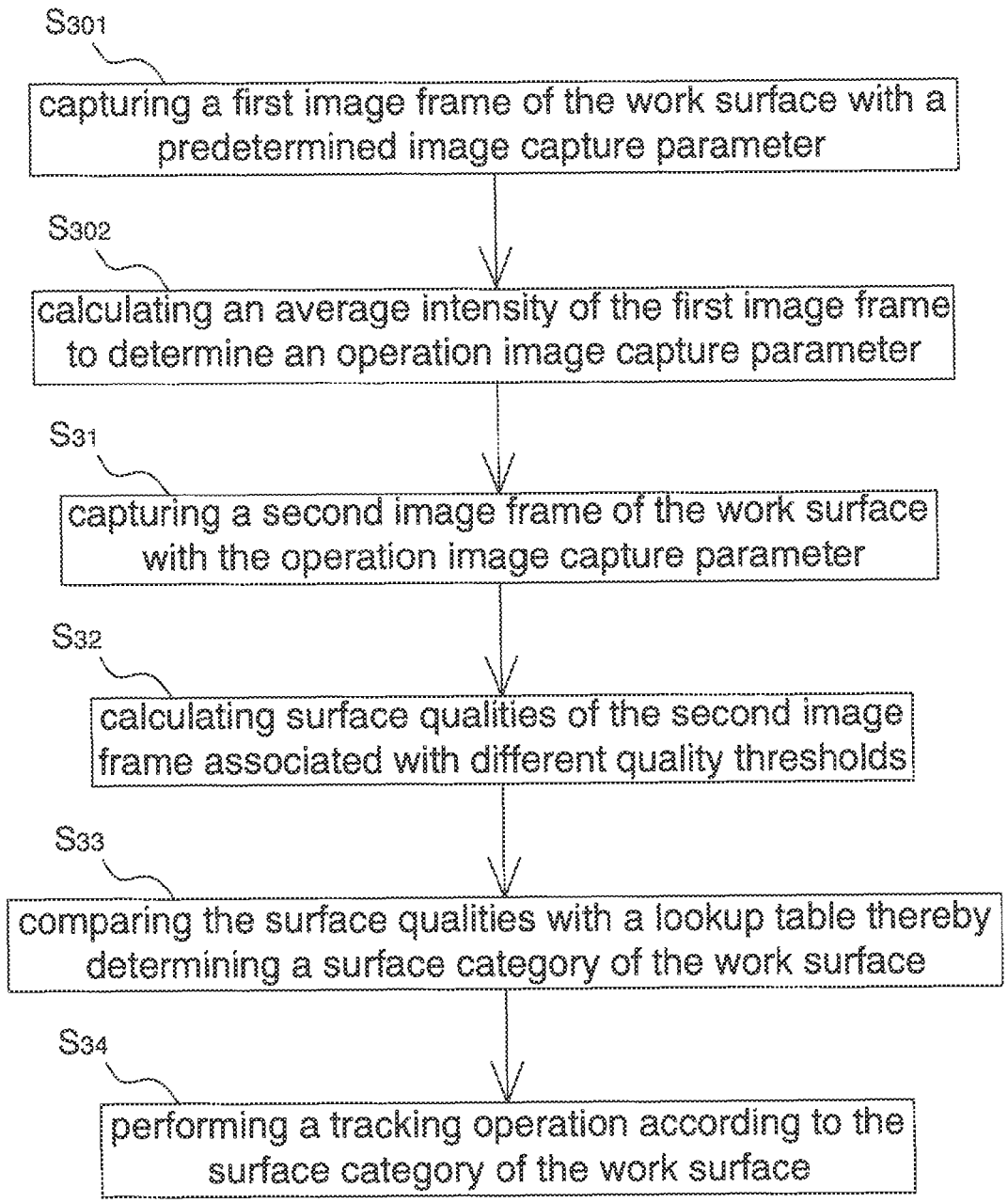
FIG. 5 shows a flow chart of the operating method of a navigation device according to another embodiment of the present disclosure.

In this embodiment, the navigation device 1 always, even during the operation, use a predetermined image capture parameter, e.g. including at least one of an exposure time, a shutter time, an image gain, a lighting duration and a lighting brightness, to capture an image frame IF in order to determine a surface category (Step $S_{21}$). The processing unit 14 then calculates surface qualities of the image frame IF associated with different quality thresholds that are used to construct the lookup table, e.g. 8, 16, 24 . . . 64 shown in FIG. 3A (Step $S_{22}$). As mentioned above, the processing unit 14 may calculate surface qualities of the image frame IF associated with only a part of the quality thresholds. After the surface qualities of the image frame IF are obtained, the processing unit 14 then compares the surface qualities of the image frame IF with the surface quality profiles of the lookup table so as to determine a surface category of the work surface S on which the navigation device 1 currently operates (Step $S_{23}$). Finally, the navigation device 1 performs a tracking operation according to the surface category of the work surface S, e.g. using the corresponded tracking parameters such as at least one of a depth of field, a digital filter type and a block size, to calculate the displacement and/or perform liftoff detection. The auto exposure may also be performed corresponding to the selected surface category (Step $S_{24}$), Referring to FIG. 5, it shows a flow chart of the operating method of a navigation device according to another embodiment of the present disclosure, which includes the steps of: capturing a first image frame of a work surface with a predetermined image capture parameter (Step $S_{301}$); calculating an average intensity of the first image frame to determine an operation image capture parameter (Step $S_{302}$); capturing a second image frame of the work surface with the operation image capture parameter (Step $S_{31}$); calculating surface qualities of the second image frame associated with different quality thresholds (Step $S_{32}$); comparing the surface qualities with a lookup table thereby determining a surface category of the work surface (Step $S_{33}$); and performing a tracking operation according to the surface category of the work surface (Step $S_{34}$), wherein the second image frame may be any image frame captured after the first image frame.

The difference of this embodiment and FIG. 4 is that before categorizing the work surface S, a suitable operation image capture parameter is determined at first. This embodiment may be used in (1) checking whether the surface category is changed duration operation or (2) checking whether the image frame for identifying the surface category is proper. That is, the navigation device 1 may save a plurality of lookup tables associated with different operation image capture parameters or save one lookup table as well as an offset mechanism of squat count in the surface quality profiles as shown in FIG. 3B. The image sensor 12 firstly captures a first image frame with a predetermined image capture parameter (Step $S_{301}$), wherein the first image frame is used to check whether the predetermined image capture parameter is proper or not but not used to category the work surface S. The processing unit 14 then determines a suitable operation image capture parameter according to an average brightness of the first image frame (Step $S_{302}$), wherein the average brightness may be a portion or the whole of pixels of the first image frame. It is appreciated that if the first image frame is good enough, e.g. its average brightness within a suitable range, the operation image capture parameter may be identical to the predetermined image capture parameter. After the operation image capture parameter is determined, the processing unit 14 identifies the surface category according to the Steps $S_{31}$-$S_{34}$ of FIG. 5 according to a second image frame captured after the first image frame. In this embodiment, as the Steps $S_{31}$-$S_{34}$ are similar to the Step $S_{21}$-$S_{24}$ in FIG. 4 only the predetermined image capture parameter in FIG. 4 is replaced by the operation image capture parameter and the image frame in FIG. 4 is replaced by the second image frame, thus details of the Steps $S_{31}$-$S_{34}$ are not repeated herein.

As mentioned above, the conventional optical mouse does not adjust the tracking parameter corresponding to the exposure parameter or the surface type. Therefore, the present disclosure further provides a navigation device (FIG. 1) and an operating method of the navigation device (FIGS. 4 and 5) that may select a suitable set of tracking parameters corresponding to different work surfaces in order to improve the calculation accuracy or the calculation efficiency.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A navigation device comprising:
    an illumination source;
    a CMOS image sensor directed toward a work surface on which the navigation device is being operated for capturing an image frame of the work surface on which the navigation device is being operated with a predetermined image capture parameter;
    a memory unit having a lookup table stored therein, the lookup table comprising:
        a plurality of surface quality profiles of different surface categories associated with different predetermined work surfaces, wherein each of the surface quality profiles is a surface quality distribution associated with one of the different predetermined work surfaces with respect to a set of quality thresholds, and
        a plurality sets of tracking parameters, wherein each of the surface categories is associated with one set of the tracking parameters and each set of the tracking parameters comprises a filter size and a filter strength; and
    a processor having an input coupled to the CMOS image sensor to post-process the image frame output from the CMOS image sensor, the post-processing of the processor being configured to:
        calculate surface qualities of the image frame,
        compare the surface qualities of the image frame with the lookup table to determine a surface category of the work surface on which the navigation device is being operated, and
        perform a tracking operation according to the set of the tracking parameters corresponding to the surface category of the work surface on which the navigation device is being operated.

2. The navigation device as claimed in claim 1, wherein each of the surface quality profiles comprises a plurality of surface qualities versus the set of quality thresholds.

3. The navigation device as claimed in claim 2, wherein the processor is configured to calculate the surface qualities of the image frame associated with at least a part of the set of quality thresholds.

4. The navigation device as claimed in claim 1, wherein the each set of the tracking parameters further comprises at least one of a depth of field and a block size.

5. The navigation device as claimed in claim 1, wherein the processor is configured to calculate a similarity between the surface qualities of the image frame and the surface quality profiles of the lookup table to determine the surface category of the work surface on which the navigation device is being operated.

6. The navigation device as claimed in claim 1, wherein the predetermined image capture parameter comprises at least one of an exposure time, a shutter time, an image gain, a lighting duration of the illumination source and a lighting brightness of the illumination source.

7. The navigation device as claimed in claim 1, wherein the navigation device is further configured to perform a lift-off detection according to the set of the tracking parameters corresponding to the surface category of the work surface on which the navigation device is being operated.

8. The navigation device as claimed in claim 1, wherein the navigation device is further configured to perform an auto exposure corresponding to the surface category of the work surface on which the navigation device is being operated.

9. The navigation device as claimed in claim 1, wherein the processor is further configured to determine an image capture parameter according to an average intensity of a previous image frame of the image frame to replace the predetermined image capture parameter.

10. An operating method of a navigation device, the operating method comprising:
    capturing, using an image sensor, an image frame of a work surface on which the navigation device is being operated with a predetermined image capture parameter;
    calculating, using a processing unit, surface qualities of the image frame associated with different quality thresholds;
    comparing, using the processing unit, the surface qualities of the image frame with a lookup table comprising a plurality of surface quality profiles of different surface categories associated with different predetermined work surfaces, wherein each of the surface quality profiles is a surface quality distribution associated with one of the different predetermined work surfaces with respect to the different quality thresholds, to determine a surface category of the work surface on which the navigation device is being operated; and
    performing a tracking operation according to the surface category of the work surface on which the navigation device is being operated,
    wherein each of the surface categories of the lookup table is associated with a set of tracking parameters and each set of the tracking parameters comprises a filter size and a filter strength.

11. The operating method as claimed in claim 10, wherein the each set of the tracking parameters further comprises at least one of a depth of field and a block size.

12. The operating method as claimed in claim 10, further comprising:
performing a lift-off detection according to the surface category of the work surface on which the navigation device is being operated.

13. The operating method as claimed in claim 10, wherein each of the surface categories of the lookup table is associated with a respective auto exposure mechanism.

14. An operating method of a navigation device, the operating method comprising:
capturing, using an image sensor, a first image frame of a work surface on which the navigation device is being operated with a predetermined image capture parameter;
calculating, using a processing unit, an average intensity of the first image frame to determine an operation image capture parameter;
capturing, using the image sensor, a second image frame of the work surface on which the navigation device is being operated with the operation image capture parameter;
calculating, using the processing unit, surface qualities of the second image frame associated with different quality thresholds;
comparing, using the processing unit, the surface qualities of the second image frame with a lookup table comprising a plurality of surface quality profiles of different surface categories associated with different predetermined work surfaces, wherein each of the surface quality profiles is a surface quality distribution associated with one of the different predetermined work surfaces with respect to the different quality thresholds to determine a surface category of the work surface on which the navigation device is being operated; and
performing a tracking operation according to the surface category of the work surface on which the navigation device is being operated,
wherein each of the surface categories of the lookup table is associated with a set of tracking parameters, and each set of the tracking parameters comprises a filter size and a filter strength.

15. The operating method as claimed in claim 14, wherein the predetermined image capture parameter and the operation image capture parameter comprise at least one of an exposure time, a shutter time, an image gain, a lighting duration of an illumination source and a lighting brightness of the illumination source.

16. The operating method as claimed in claim 15, wherein the each set of the tracking parameters further comprises at least one of a depth of field and a block size.

17. The operating method as claimed in claim 14, wherein the navigation device saves a plurality of lookup tables or an offset algorithm associated with different operation image capture parameters.

18. The operating method as claimed in claim 14, further comprising:
performing a lift-off detection according to the surface category of the work surface on which the navigation device is currently operated.

19. The operating method as claimed in claim 14, wherein each of the surface categories of the lookup table is associated with a respective auto exposure mechanism.

* * * * *